United States Patent

[11] 3,544,760

| [72] | Inventor | Johannes Jacobus Broodman<br>Breskens, Netherlands |
|---|---|---|
| [21] | Appl. No. | 720,033 |
| [22] | Filed | April 10, 1968 |
| [45] | Patented | Dec. 1, 1970 |
| [73] | Assignee | N.V. Koninklijke Maatschappij "De Schelde" |
| [32] | Priority | April 12, 1967 |
| [33] | | Netherlands |
| [31] | | No. 6705165 |

[54] PROCESS FOR GAS-SHIELDED ARC WELDING WITH A NONCONSUMABLE ELECTRODE
6 Claims, 7 Drawing Figs.

[52] U.S. Cl. ................................................ 219/137
[51] Int. Cl. .................................................. B23k 9/00
[50] Field of Search ........................................... 219/59, 60, 61, 130, 135, 137

[56] References Cited
UNITED STATES PATENTS

| 2,886,696 | 5/1959 | Tuthill et al. ................. | 219/137 |
| 3,068,352 | 12/1962 | Correy ......................... | 219/137 |
| 3,071,680 | 1/1963 | Anderson et al. ............. | 219/131 |
| 3,102,948 | 9/1963 | McCampbell et al. ......... | 219/137 |
| 3,275,797 | 9/1966 | Manz ............................ | 219/137 |
| 3,330,933 | 7/1967 | Maklary ....................... | 219/135X |
| 3,390,250 | 6/1968 | Apblett et al. ................ | 219/135X |

Primary Examiner—J. V. Truhe
Assistant Examiner—C. L. Albritton
Attorney—Ralph E. Bucknam, Jesse D. Reingold, Robert R. Stack and Henry A. Maryullo, Jr.

ABSTRACT: A gas-shielded arc welding process whereby during passage of an electric arc over a workpiece, the welding current is varied in alternating high- and low-intensity intervals, such that the weld metal is melted during the high-intensity interval and solidifies during the low-intensity interval. The low and high current intensity levels are controlled to vary between about 50 percent and at least 150 percent respectively, of the average welding current.

INVENTOR
JOHANNES J. BROODMAN
BY
ATTORNEY

PROCESS FOR GAS-SHIELDED ARC WELDING WITH A NONCONSUMABLE ELECTRODE

The invention relates to a process for gas-shielded arc welding with a nonconsumable electrode. In the hitherto used welding processes, also those of the above-mentioned kind, during welding with a low current intensity the weld is adversely affected by gravity. This applies in particular to the position-welding of thin workpieces or to the welding of a thin to a thick workpiece. In consequence, so-called downhand welding will generally be applied. In all other positions, such as vertical overhead welding and the welding of a vertical seam, special precautions must be taken. It is common practice, if a qualitatively good welded joint must be brought about between two workpieces which differ very much in thickness, to provide on the thick material an adapter portion for the thin material, such that a welded joint is formed between two workpieces differing only little in thickness. If all the same a direct joint between two workpieces differing in thickness must be brought about, as a rule this is only possible under certain conditions. A frequently occurring example is that of the welding of tubes to the opposite side of a tube sheet, e.g. in heat exchangers, where the weld is produced in the bore in the tube sheet. In the welding of the joints, in order to obtain a symmetrical configuration of the welds, the bank of tubes must be positioned vertically and the tube sheet horizontally. It has been found possible under these conditions to weld the tubes directly in the bore in a sheet without giving any special form to the bore (see e.g. British Pat. specification No. 1,040,156). If tubes with a small wall thickness, such as 0.8—2 mm., have to be welded in, the conventional methods place high demands on the accuracy of the apparatus, the positioning, and the preparation.

Since in heat exchangers the flow resistance in the tubes is very important, it will be obvious that irregular welds are not impermissible. The vertical positioning of banks of tubes in the welding of very long heat exchangers (12—24 mm.) however, involves great difficulties from the viewpoint of workshop technique.

SUMMARY OF THE INVENTION

The above-mentioned drawbacks are avoided in the process according to the invention, which is characterized in that the welding current during the passing of the electric arc over the work is varied according to a given curve with alternating intervals of high- and low-current intensity. The process according to the invention gives an exceptionally regular weld in all positions, a very constant fusion through the melt, and a favourable proportion between the heat input than in the case of normal shielded arc welding. The process according to the invention can be applied successfully for welding in diverse positions, where lower current intensities are normally required, and is particularly suitable for the welding in all positions of thin workpieces to thick workpieces. The welding process according to the invention has all the advantages of welding with high current intensity, while the total amount of heat input can be limited.

Since the average current intensity can be small with respect to the current intensity during the high interval, it is possible to work with a relatively small electrode diameter, by which the rigidity of the electric arc and the penetration into the work are promoted. The greater rigidity of the arc in the operative part of the welding interval promotes the bath turbulence and diminishes the sensitivity of possible disturbing influences on the arc due to the blowing action through asymmetrical current supply. The disturbing influence of the blowing action is further reduced by the varying character of the welding current, as a result of which eddy currents are generated, causing a field which tends to compensate the magnetic field of the arc.

If the process according to the invention is applied for shielded manual arc welding, welding with an arc of high rigidity presents the advantage that the latter is less sensitive to the variation of the flow pattern of the shielded gas owing to a varying position of the outlet nozzle of the welding torch with respect to the work.

At the beginning of the interval with high current intensity the arc is directed at the not yet fused material or at the boundary thereof, in consequence of which the initial situation is always the same.

Owing to the high current intensity in the operative part of the welding interval a weld can be made in a given position, e.g. overhead or vertically, in which case the influence of the force of gravity is compensated by the great arc force. If a weld between a thin and a thick workpiece must be produced, as in the case of the said heat exchanger, at a low current intensity the arc follows the varying form of the welded joint, in consequence of which it deflects in the direction of the tube. The result of this is an unstable arc, while finally so much heat is supplied to the thin part (tube) that it fuses through completely. Attempts have been made to obviate this by working with a very short arc length. This drawback, however, is also avoided in the process according to the invention.

During the interval with high current intensity, owing to the great rigidity the arc continues to be directed at the original joint, viz. the heavy part, while the arc length is less critical. Moreover the weld obtained is one with greater penetration in the heavy part and smaller extension in the thin part than was hitherto the case.

After the interval with high current intensity, the current is reduced to such an extent that no crater formation takes place. The minimum current intensity is so chosen that a favorable cooling condition for the solidifying material is satisfied and that sufficient support by the arc forces on the shrinking melting bath remains present. The transition from maximum to minimum current intensity may take place according to an adjustable smooth curve.

If the position of the arc has shifted sufficiently and is near the edge of the melt which has been formed in the preceding interval with high current intensity, a period with high current intensity follows again. The frequency of the intervals with high and low current intensity is determined by the welding speed, the nature of the material, and the form of the work. As a basic form a welding current with a rectangular wave form can be applied, while the duration of the intervals with low and high current intensity may vary between about 0.2 and 1.5 seconds, dependent upon the moving speed of the arc and the nature and the form of the material. The maximum duration of the interval with high current intensity is 50 percent of a complete period, consisting of the sum of an interval with low current intensity and an interval with high current intensity. As a rule the penetration increases with decrease of the duration of the interval with high current intensity if the average welding current remains constant during the complete period.

Since the power supply takes place within a shorter interval, the efficiency of the welding process increases and less heat is supplied to the work. A further advantage is the reduction of the total heat zone.

With an average constant power supply the form of the weld can be influenced by variation of the intervals with high and low current intensity. A high current peak gives a deeper penetration and a comparatively small width to the weld. A minimum penetration is obtained if the power is supplied with constant current intensity. If the same penetration with constant current intensity is to be achieved as in the welding process according to the invention, this implies that more heat must be supplied to the work, in consequence of which during the welding process a larger amount of molten material is present. The gravity influences are therefore greater than in the welding process according to the invention, while the compensating arc forces are smaller because the average current intensity is lower than that during the interval with the high current intensity in the process according to the invention, in which, if the maximum melting bath is present, also the maximum arc forces act on the melting bath.

The process according to the invention can be successfully applied in the welding of various materials, such as carbon steel stainless steel, copper and nickel alloys, titanium, etc. since the programing of the welding process can be adapted in a simple way to the specific properties of the materials to be welded.

BRIEF DESCRIPTION OF THE DRAWING

The invention will now be elucidated further with reference to the drawings.

FIG. 3 shows, partly in section, an arrangement for the welding of tubes to a tube sheet according to the process of the present invention.

In FIG. 1a, a number of cycles of a basic wave form of the welding current according to the invention are shown graphically in which along the ordinate is plotted the current intensity and along the abscissa the time. The minimum welding current is denoted by $i_1$ and the maximum welding current by $i_2$, while the duration of the interval with minimum current is $t_1$ and that of the interval with maximum current $t_2$. As already stated, $t_2$ is at most 50 percent of the period $t_1 + t_2$. For greater penetration as a rule there will be a tendency to use a shorter duration of the interval $t_2$, in which case the average value may decrease as the maximum level increases. Taking into account the duration $t_1$ and $t_2$ of the intervals and the welding speed, this average value of the welding current, i.e., the integral of the total current as a function of time over the period $t_1 + t_2$, may be smaller than the constant welding current commonly used during the welding of the same parts with the same welding speed. It has been found that the effects of the inventive process are achieved when the low and high current varies between about 50 percent and at least 150 percent, respectively, of the average value of welding current. If during the low interval the current intensity amounts to 50 amperes, for instance, during the high interval it must be at least 150 amperes. As already stated, during the low interval the current intensity is determined by various circumstances, such as the maintenance of a sufficient pressure on the material, the maintenance of the arc, a limited cooling of the melting bath.

Figure 1A:
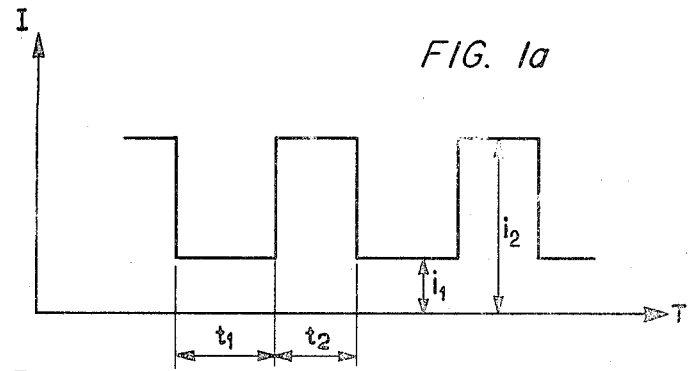
FIGS. 1a and 1b show wave forms of the welding current according to the invention.
Figure 1B:
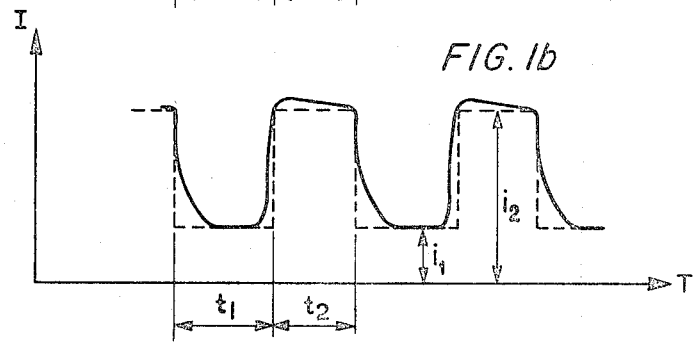

In general a rectangular wave form according to FIG. 1a will in practice not be desirable and a wave form according to FIG. 1b will be chosen. It is of advantage, however, to make the leading edge of the interval with high current intensity as steep as possible, and to adapt the trailing edge to the permissible cooling condition, in order that the effective value of this current may become as high as possible.

Figures 2A, 2B:
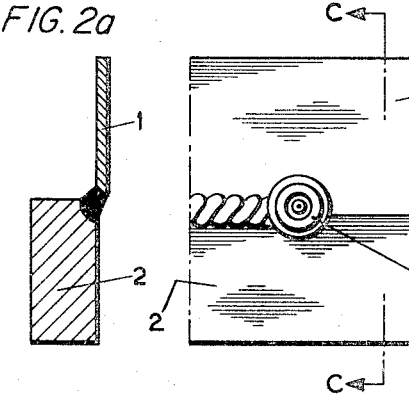
FIG. 2a shows a section of a workpiece welded according to the invention.
FIG. 2b shows a front view or arc side of the workpiece illustrated in FIG. 2a when it has been partly welded.

FIG. 2a shows a section of a workpiece of stainless steel welded according to the invention. It can quite clearly be seen that the weld has penetrated deeply into the thick part and that only a small amount of the material of the thin part has melted. In spite of the fact the weld has been produced with a horizontally directed welding torch the weld has not moved downwardly. The pulse shaped welding current of high intensity keeps the welding bath sufficiently in position, while during the interval of low current intensity the melt rapidly solidifies at the rear, so that the melt is kept better in position by adhesive forces and surface tensions.

FIG. 2b shows a view of the workpiece according to FIG. 2a while it has been partly welded. The overlapping solidified welding pools are clearly visible. In this FIG. 2b, 3 is the welding torch, which is moved from left to right.

Figure 2C:
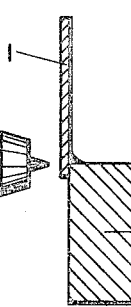
FIG. 2c shows a section along the line C–C of FIG. 2b.
Figure 2D:
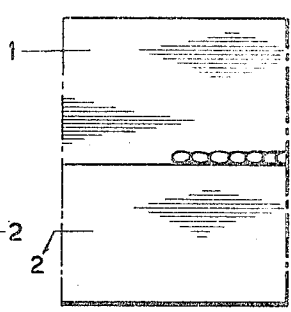
FIG. 2d shows the rear view opposite to the arc side of the workpiece illustrated in FIG. 2a, when it has been partly welded.
Figure 2:
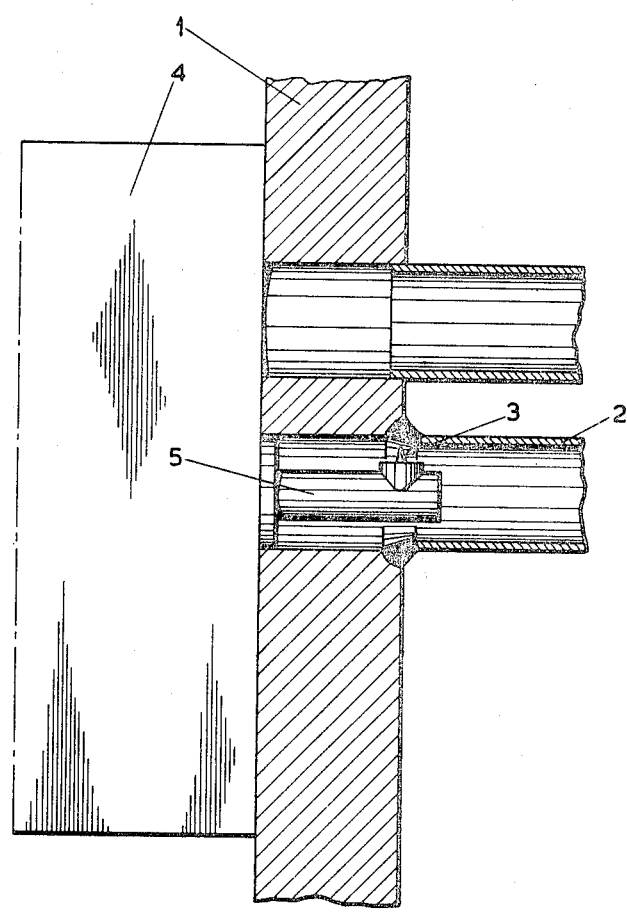

FIG. 2c shows a section along the line C–C in FIG. 2. The thin workpiece 1 is welded only locally to the thick workpiece 2.

FIG. 2d shows the side of the workpiece opposite to the arc side when it has been welded over the distance shown in FIG. 2b. Here again the overlapping welding pools are clearly visible. It is also evident that only a small amount of the material of the thin part has melted, in contrast to what happens with the hitherto commonly used process with constant current. Here the welding pools in the thin part would be much broader, which tends to lead to irregularities in the form of the weld with such thin material, while locally the weld may become perforated.

FIG. 3 shows an arrangement for the welding of tubes 2 with a diameter of 20 mm. and a wall thickness of 1 mm. to a tube sheet 1 for a heat exchanger. As appears from FIG. 3, the tube to be welded is first brought into the bore in the sheet over a depth of about 2 to 3 mm. Subsequently the welding torch 5, by the welding head 4, is brought from the opposite side of the sheet into the bore and centred, and the tube is welded to the sheet by the "internal bore welding" method with the aid of electrode 3 with a speed of 30 mm. per minute, for instance. In the embodiment of FIG. 3, in accordance with the process of the invention a welding current is supplied with a low level $i_1$ of 30 amperes and a duration $t_1$ of 1 second, and a high level $i_2$ of 175 amperes and a duration $t_2$ of 0.5 second. From the FIG. it is again evident that with this process a great penetration of the weld into the thick sheet is obtained, while only a small part of the thin tube melts. The weld has a symmetrical configuration and is independent of the position along the circumference of the tube, i.e. the force of gravity, which in the various positions of the arc assumes a different direction with respect to the arc, has a negligible influence on the form of the weld.

With the same arrangement, but with a constant current intensity of 75 amperes, equal to the average current intensity in the above-mentioned case, a weld is formed which not only penetrates less deeply into the thick workpiece and constitutes a larger part of the thin workpiece, but moreover is greatly influenced by the force of gravity, which is particularly disadvantageous, because a very large amount of the material of the thin workpiece is melted. The weld will move downwards at the bottom as well as the top of the circumferential weld, which has an adverse effect on the flow resistance of the tube.

I claim:

1. A process for gas-shielded arc welding with a nonconsumable electrode, comprising varying the welding current during passage of an electric arc over a workpiece to be welded, according to a predetermined curve having alternating intervals of high current intensity during which the weld metal is melted and a penetrating weld formed, and low current intensity during which the weld metal solidifies; said interval with the high current intensity beginning when passage of the arc over the workpiece placed it in the vicinity of the edge of the melted portion effected during the preceding interval with high current intensity; said intervals of high and low current intensity having a duration varying in the range from between about 0.2 seconds and about 1.5 seconds, and having an intensity ratio of at least 3:1; the duration of the interval of high current intensity being at most equal to the duration of the interval of low current intensity.

2. A process for gas-shielded arc welding with a nonconsumable electrode, comprising varying the welding current during the passage of an electric arc over a workpiece to be welded, according to a predetermined curve having alternating intervals of high current intensity and of low current intensity, such that the weld metal is melted during the interval of high current intensity and solidifies during the succeeding interval of low current intensity, the next succeeding interval of high current intensity beginning with the arc in a position in the vicinity of the edge of the melted portion effected by the welding arc during the preceeding interval of high current intensity; said intervals of high and low current intensity having a duration varying in the range between about 0.2 seconds and about 1.5 seconds, said low and high current intensity varying between about 50 percent and at least 150 percent, respectively, of the average welding current; the duration of the interval of high current intensity being at most equal to the duration of the interval of low current intensity.

3. The process according to claim 2, wherein the current impulse during the interval of high current intensity has a steep leading edge.

4. The process according to claim 2, wherein said interval of high current intensity is equal to one-third of the duration of said interval of low current intensity.

5. The process according to claim 2, wherein the integral of the total welding current over a complete cycle of high and low current intensity is smaller than the constant welding current commonly used in the welding of the same parts with the same welding speed.

6. The process according to claim 5, wherein said integral of the total welding current decreases as the maximum current intensity increases.